(12) United States Patent
Way

(10) Patent No.: US 6,279,437 B1
(45) Date of Patent: Aug. 28, 2001

(54) PIPE BEVELING MACHINE

(75) Inventor: Arlan W. Way, Gladstone, OR (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 0 days.

(21) Appl. No.: 09/313,879

(22) Filed: May 18, 1999

Related U.S. Application Data

(60) Provisional application No. 60/086,816, filed on May 26, 1998.

(51) Int. Cl.[7] ................................ B23B 5/16; B23B 3/26
(52) U.S. Cl. ........................................ 82/113; 161/168
(58) Field of Search ............................ 82/113, 82, 168, 82/161, 1.2; 408/79, 80

(56) References Cited

U.S. PATENT DOCUMENTS

| | | |
|---|---|---|
| 126,522 | 5/1872 | Cooper . |
| 2,004,741 | 6/1935 | Zimmerman . |
| 2,035,687 | 3/1936 | Briegel . |
| 2,130,182 | 9/1938 | Hogg . |
| 2,398,278 | 4/1946 | Bailey . |
| 2,478,310 | 8/1949 | Payne . |
| 2,595,541 | 5/1952 | Riordan . |
| 3,171,309 | 3/1965 | Cloutier . |
| 3,202,190 | 8/1965 | Gill . |
| 3,383,723 | 5/1968 | Connelly . |
| 3,765,790 | 10/1973 | Kubicek . |
| 3,927,584 | * 12/1975 | Mayfield ................................ 82/113 |
| 4,434,689 | * 3/1984 | Nall et al. .............................. 82/113 |
| 4,483,222 | * 11/1984 | Davis ................................. 82/113 X |
| 4,601,222 | * 7/1986 | Gill ...................................... 82/113 |
| 4,621,548 | 11/1986 | Kubo et al. . |
| 4,811,639 | 3/1989 | Gress et al. . |
| 4,840,360 | 6/1989 | Bartley . |
| 4,852,435 | 8/1989 | Hunt . |
| 5,050,291 | 9/1991 | Gilmore . |
| 5,074,177 | 12/1991 | Schmidt . |
| 5,083,484 | 1/1992 | VanderPol et al. . |
| 5,133,565 | 7/1992 | Schmidt . |
| 5,304,018 | 4/1994 | LaVanchy et al. . |
| 5,429,021 | 7/1995 | Astle et al. . |
| 5,531,537 | 7/1996 | Pink et al. . |
| 5,711,197 | 1/1998 | Ohmi et al. . |

FOREIGN PATENT DOCUMENTS

| | | | |
|---|---|---|---|
| 0217704 | * 4/1987 | (EP) | ...................................... 82/113 |
| 06079501 | 3/1994 | (JP) . | |
| 406079501 | * 3/1994 | (JP) | ...................................... 82/113 |

* cited by examiner

Primary Examiner—Henry Tsai
(74) Attorney, Agent, or Firm—Dellett and Walters

(57) ABSTRACT

A pipe beveling tool employs a draw bolt that pulls an actuator rearwardly. The draw bolt does not extend all the way through the device, enabling smaller diameter pipes to be engaged. Wedge keys provide adjustable engagement of the driving system to prevent or allow reduction of backlash.

16 Claims, 6 Drawing Sheets

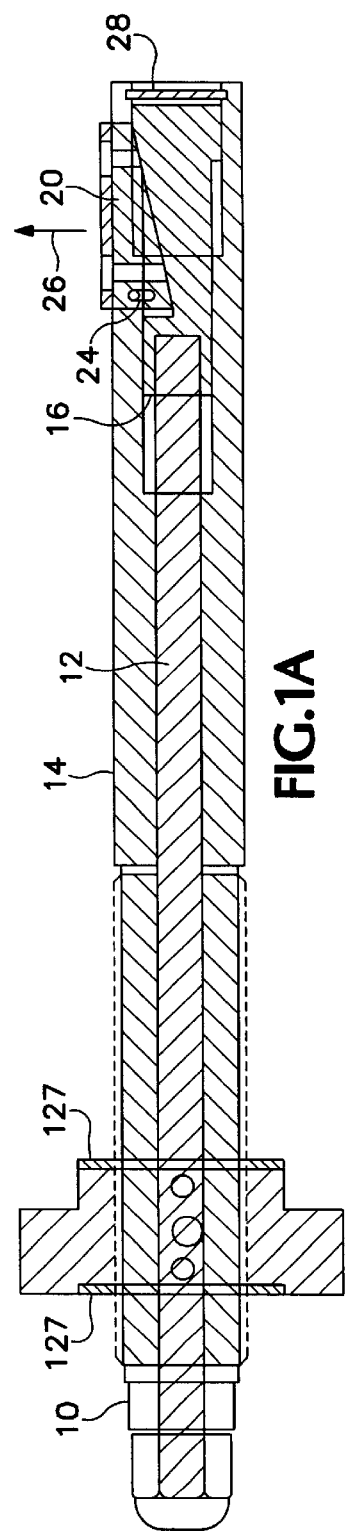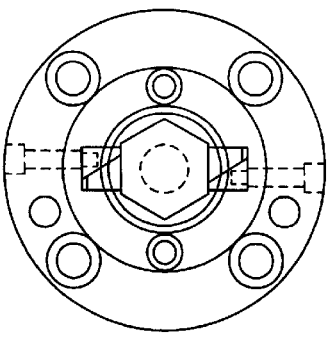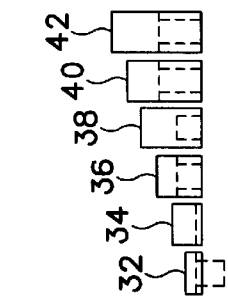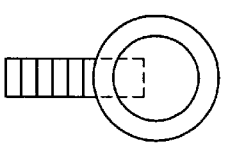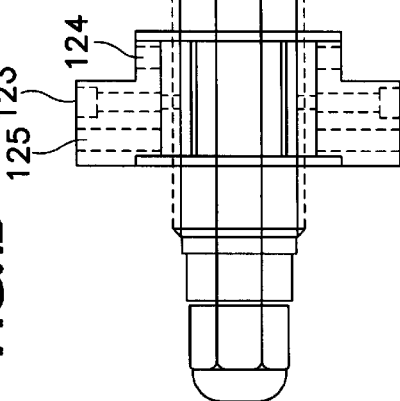

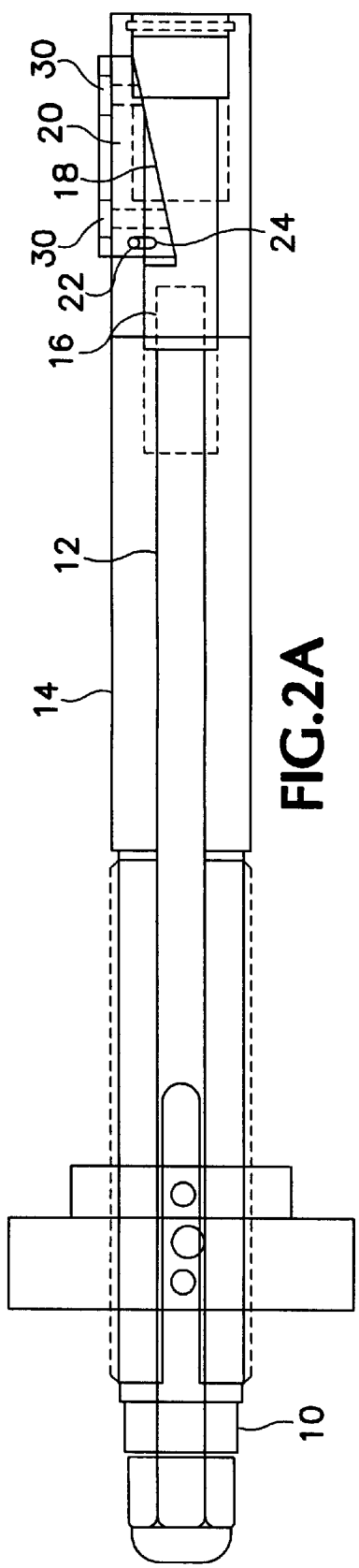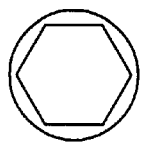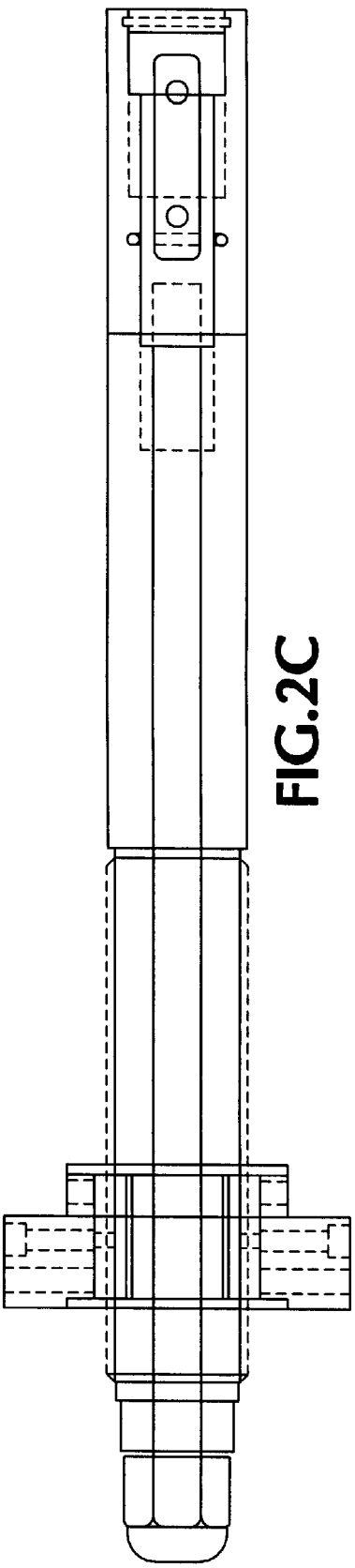

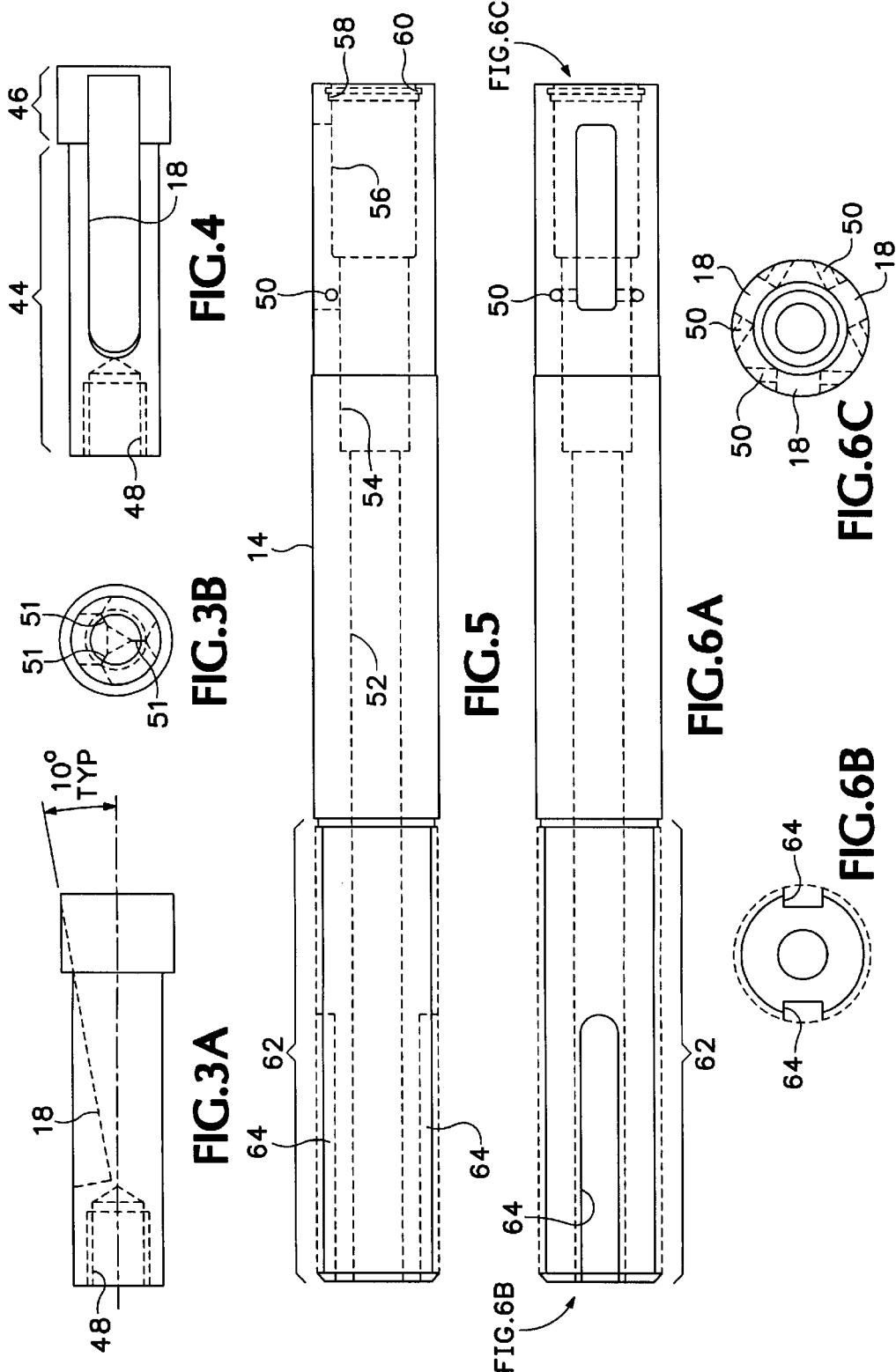

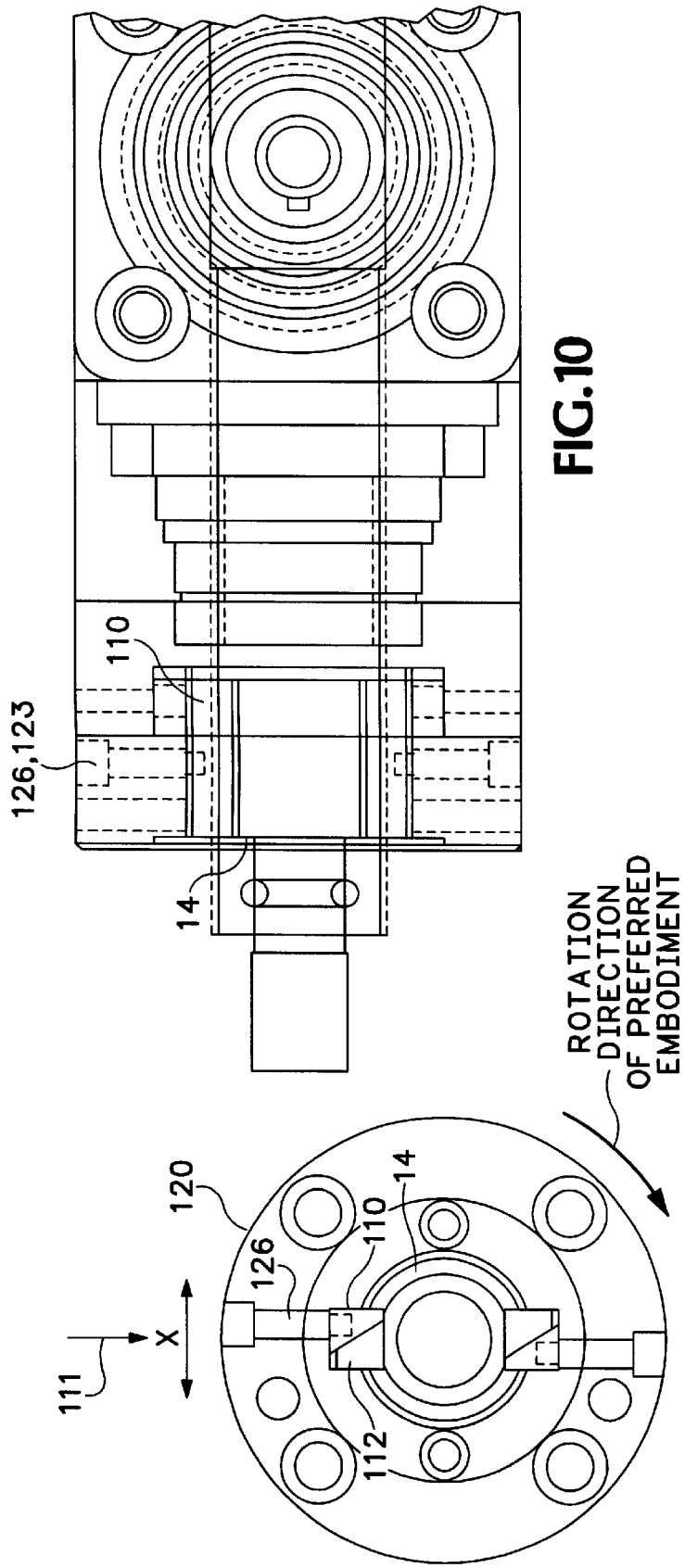

PIPE BEVELING MACHINE

This application claim benefit of Ser. No. 60/086,816 filed May 26, 1998.

BACKGROUND OF THE INVENTION

This invention relates to pipe tools and more particularly to a pipe beveling machine with improved operation and structure.

In pipe beveling, a beveling machine is typically mounted within the pipe to be beveled, by means of a mandrel device that secures the machine in relation to the pipe by engaging the inner walls of the pipe. A draw bolt is provided and tightening of a draw nut causes portions of the mandrel to expand and engage the pipe. Heretofore, if the draw bolt was to break, components of the mandrel would fall off, into the pipe. Such an accident can be annoying and difficult to remedy, as the component might end up at rest in a bend in the pipe a great distance from the beveling site. The particular resting site would have to be located, and the pipe cut open to retrieve the components. To address this issue, some mandrels employ a spring that allows expansion of components for engaging the pipe walls, but still holds the components to the mandrel. However, this is not always satisfactory, as the spring can break (and fall off), and if the draw bolt does break, often the surrounding mechanisms that hold the spring also fall off, into the pipe.

In beveling and facing devices, it is desirable to have a backlash free engagement between the driving and driven portions of the devices. There are numerous designs of mechanical keys that fit into correspondingly shaped grooves or "keyways" of mechanical members to lock the mechanical members from moving relative to each other in one or more axes. The Woodruff, Saddle, and Gib-head keys are some of the more common designs. Most of the mechanical industry's keys are of a single piece design and are not adjustable. This means that they must be designed with somewhat relaxed tolerances that allow for friction fit and installation. In high torque situations this "loose" fit is undesirable as it leads to accelerated wear resulting in "backlash" (movement of one element relative to the other) and a greater potential for key failure due to the higher shear forces encountered with "backlash". Conventional mechanical keys do not address this problem. If backlash is present, given the high torque situations, "chatter" can result, giving a rough or poor cut or faced portion.

A particular application for these keys is seen in such high torque applications as beveling tools for pipes or facing tools. A mandrel clamps to a pipe and a non-rotatable power unit is slideably mounted on the mandrel. The power unit has a rotatable portion that holds and rotates a cutting tool to "face" the pipe. The power unit itself does not rotate and is held from doing so by locking keys that are interposed between the axial mandrel grooves, and keyways cut into the non-rotatable power unit. These locking keys also mount the power unit onto the mandrel. The power unit slides axially along the mandrel to feed the cutting tool into the pipe. When in operation, these locking keys experience high torque loads in maintaining the stationary position of the non-rotatable power unit in response to the reactionary force experienced as its rotatable portion faces the pipe. These keys are subject to extreme shear forces and wear quickly. As they wear there is more "backlash" movement developed between the non-rotatable power unit and the mandrel, thereby increasing the shear forces and accelerating wear. Most of the locking keys in the industry do not accommodate for wear and are not adjustable, requiring frequent replacement.

SUMMARY OF THE INVENTION

In accordance with the invention, a pipe beveling machine includes a mandrel portion with ramps that move outwardly to engage a pipe's inner surface. A draw bolt attaches to an actuator having ramp receiving portions thereon, and as the draw nut is tightened, the actuator is pulled back by the draw bolt, causing the ramp portions to extend.

Accordingly, it is an object of the present invention to provide an improved mandrel system that prevents pieces from falling off should the draw bolt break.

It is a further object of the present invention to provide an improved mandrel system that is able to fit in smaller diameter pipes.

A further object of the invention is to provide an improved backlash free wedge key engagement between a mandrel and the rest of the device.

It is yet another object of the present invention to provide an improved pipe beveling machine that reduces backlash.

A further object of the invention is to provide an improved backlash prevention system that accommodates wear.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIGS. 1A–1F comprise a side sectional view, an end view (without the collar member), an opposite end view (without the collar member), views of the spacer blocks, a transparent side view and an end view (with the collar member), respectively of the mandrel/actuator portion of the pipe beveling machine, with FIG. 1E and FIG. 1A perpendicular and at 90 degrees to one of the ramp members;

FIGS. 2A–2C comprise a side transparent view, an end view without the collar member and a side transparent view, respectively of the mandrel/actuator portion of the pipe beveling machine with FIG. 2C and FIG. 2A perpendicular and at 90 degrees to one of the ramp members;

FIG. 3A is a more detailed side view drawing of the actuator portion of the invention;

FIG. 3B is an end view thereof;

FIG. 4 is a view of the actuator of FIG. 3 rotated 90 degrees;

FIG. 5 is a more detailed drawing of the mandrel portion of the invention;

FIG. 6A is a view of the mandrel of FIG. 5 rotated 90 degrees;

FIG. 6B is an end view of the mandrel of FIG. 6A taken from the left end thereof;

FIG. 6C is an end view of the mandrel of FIG. 6A taken from the right end thereof;

FIG. 10 is a transparent sectional view along the longitudinal axis of the mandrel showing the operational positioning of the wedge key relative to the adjusting screw boss;

FIG. 11 is an end view taken perpendicular to the axis of the mandrel; and

FIG. 12B is a view of the mandrel of FIG. 12A, rotated 90° from the view of FIG. 12A.

DETAILED DESCRIPTION

Figure 7:
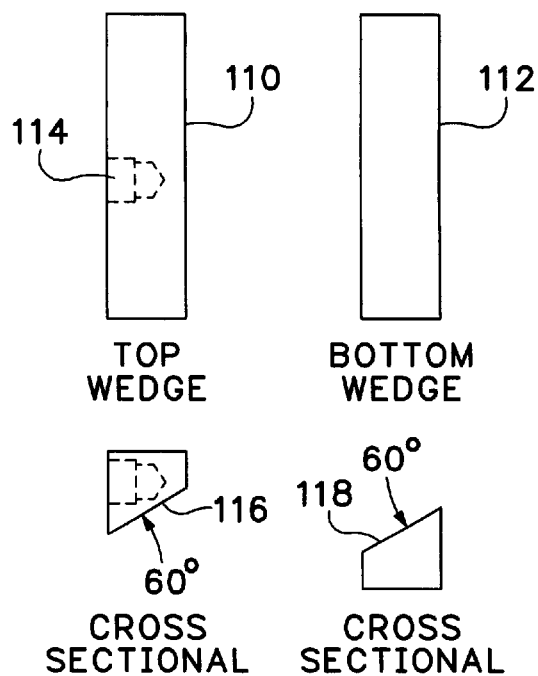
FIG. 7 shows the top and bottom portions of the wedge key, both side view and end sectionals thereof.
Figure 8:
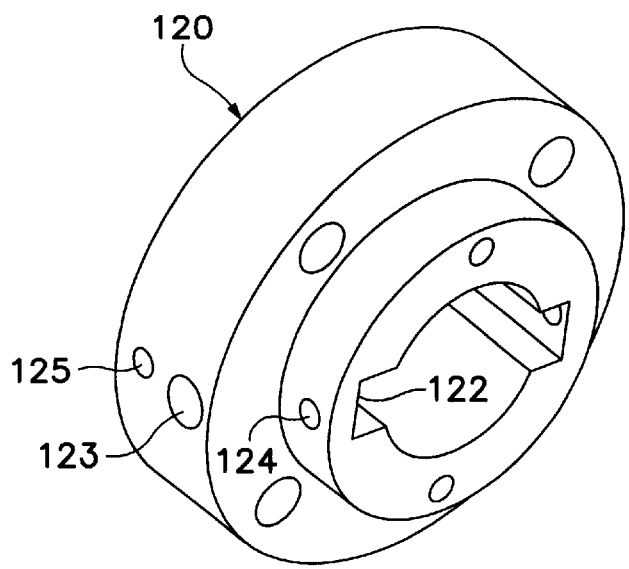
FIG. 8 illustrates a non-rotatable member with keyways cut into its inner surface to receive the wedge key and threaded bosses to receive the adjusting screw.
Figure 9:
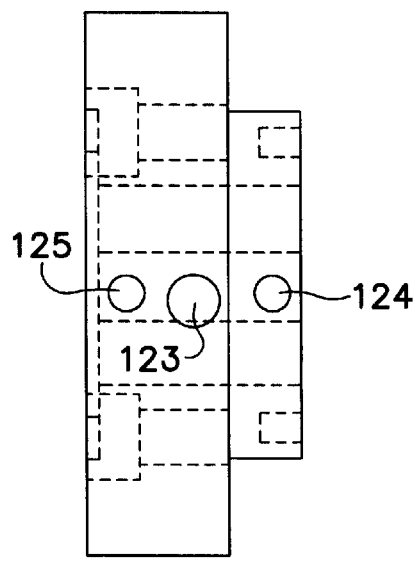
FIG. 9 is a transparent sectional view of the non-rotatable member.

The system according to a preferred embodiment of the present invention comprises a pipe beveling machine with an improved mandrel system. Referring to FIGS. 1A–1F, which include a side sectional view of the mandrel/actuator portion of the pipe beveling machine, with views both perpendicular and at 90 degrees to one of the ramp members, and to FIGS. 2A and 2B which comprise transparent views of the mandrel portion of the pipe beveling machine, the device comprises a draw nut 10 which is threadably engaged with a draw rod 12 at one end thereof. The draw rod is received in the center of a mandrel 14, and the end of the draw rod distal from the draw nut engages an actuator 16. The actuator includes angled ramp receiving portions 18 therein. In the preferred embodiment, there are three such ramp receiving portions, spaced radially about the actuator, 120 degrees apart. A corresponding ramp member 20 fits within portion 18, and is held to mandrel body 14 by ramp retainer pin 22. An elongate pin slot 24 is defined in the ramp to enable inward and outward radial expansion of the ramps along respective axis 26 (each individual ramp has its own radially outwardly extending axis 26, which is suitably 120 degrees from an adjacent ramp's axis 26). An end cap 28 is secured at the end of the mandrel (e.g. by a snap ring) that is distal from the draw nut, and serves as a retainer to keep actuator 16 within the body of the mandrel.

An individual ramp member 20 carries first and second threaded bolt receiving holes 30 therein, suitably spaced near front and rear ends of the ramp member, and plural spacer blocks 32, 34, 36, 38, 40 and 42 (for example) are available, each having a different height, with corresponding bolt holes therein, so that different height spacers can be bolted to the ramp member 20, to change the ramp height. The right hand side of FIG. 1 shows an end composite view of the mandrel with each of the various ramp spacer blocks thereon, to indicate the different height variations available in the particular illustrated embodiment. FIGS. 1B and 1F show end views of the draw nut at the end of the device and the collar member 120, discussed hereinbelow in connection with FIG. 11.

Referring now to FIGS. 3A and 4B, which are a more detailed drawing of the actuator portion of the invention (side and end views) and a view of the actuator of FIG. 3A rotated 90 degrees, respectively, the actuator 16 is shown in greater detail. Each of the three ramp receiving portions 18 is typically angled at 10 degrees in the preferred embodiment. The body of the receiver 18 comprises a first portion having a first diameter and extending most of the length of the actuator, and a second slightly wider diameter portion 46 at one end of the actuator. The end opposite portion 46 has an aperture 48 formed therein for receiving the end of the draw bolt therein. Note areas 51 where ends of the three ramp receiving portions "overlap", typically defining an opening from one ramp receiving portion to the next.

Referring now to FIG. 5 and FIG. 6A, which are more detailed drawing of the mandrel portion of the invention, rotated 90 degrees from each other, note the ramp retaining pin hole 50 that receives retaining pin 22 (FIG. 2) therein to hold the ramps and prevent their falling out during normal operation of the device and in case the draw bolt breaks. A first longitudinal bore 52 is defined in the center of the mandrel body 14, to receive the draw bolt therethrough. Near one end of the mandrel, the bore becomes a larger diameter bore 54 that is slightly larger than the diameter of portion 44 of the actuator, and a still larger diameter bore 56 that is slightly larger than the diameter of portion 46 of the actuator. A good sliding fit between the actuator and mandrel are thereby provided when the device is assembled, while still maintaining the actuator well centered in the mandrel. An end cap receiving slot 58 is formed at the end of the mandrel and fits an end cap (not shown) therein to hold the actuator and draw bolt within the center of the mandrel (should the draw nut be removed or should the draw bolt break). Such an arrangement prevents portions of the device from falling into a pipe that is being operated on if the draw bolt breaks or if the draw nut is removed. A second radial slot 60 is formed to receive a retaining ring therein, to hold the end cap in place. FIG. 6C is an end view of the actuator end of the mandrel, illustrating the relation of the pin holes 50 and ramp receiving portions 18.

Referring still to FIG. 5 and FIG. 6A, at the end of the mandrel opposite the actuator receiving portions, a portion of the mandrel is narrowed slightly and has 2 keyways 64 defined therein. These keyways receive wedge keys therein to secure non-rotational engagement between a collar member and the mandrel, to enable rotary driving of a cutting tool relative to the mandrel. FIG. 6B is an end view of FIG. 6A, from the left end thereof as seen in FIG. 6A, further illustrating the configuration of the keyways 64.

Referring to FIG. 7, both side view and end sectionals views of the top and bottom portions of the wedge key, and FIG. 11, an end view taken perpendicular to the axis of the mandrel, the key wedge system employs a top wedge 110 having a boss 114 defined centrally thereof to receive the end of a retaining bolt 126, and a bottom wedge 112. Both wedges have one face 116 and 118 along their longitudinal axis that is beveled at 60° in the preferred embodiment. These faces comprise the mating faces between the two wedge pieces.

Referring to FIG. 11, in use, the collar member 120 and mandrel 14 are positioned with their keyways 122 and 64 aligned. The two wedge pieces are placed together in the keyways such that their beveled faces mate and the retaining bolt boss 114 aligns with boss 123. First and second adjusting screws are received within adjusting screw threads 124, 125, which are spaced in the collar to position the adjusting screws near distal ends of an individual wedge key. The adjusting screws are turned such that they traverse down and contact the top wedge 110. This in turn forces the beveled face of top wedge 110 to slide in the direction of arrow 111 along the beveled face of bottom wedge 112, thereby increasing the overall width of the wedge in the direction illustrated by arrow X in FIG. 11. This causes the outer faces of both top wedge 110 and bottom wedge 112 to bear against the side faces of the keyways 122 and 64 in the member 120 and mandrel 14. The friction generated between the wedge key and the keyways prevents the member and mandrel from moving relative to each other in a rotational direction. To accommodate for wear or "backlash", the adjusting screws can be tightened, thereby increasing the width of the wedges. Retaining plates 127 (FIG. 1) at front and back faces of the collar member 120 maintain the keys within the collar.

Figure 12A:
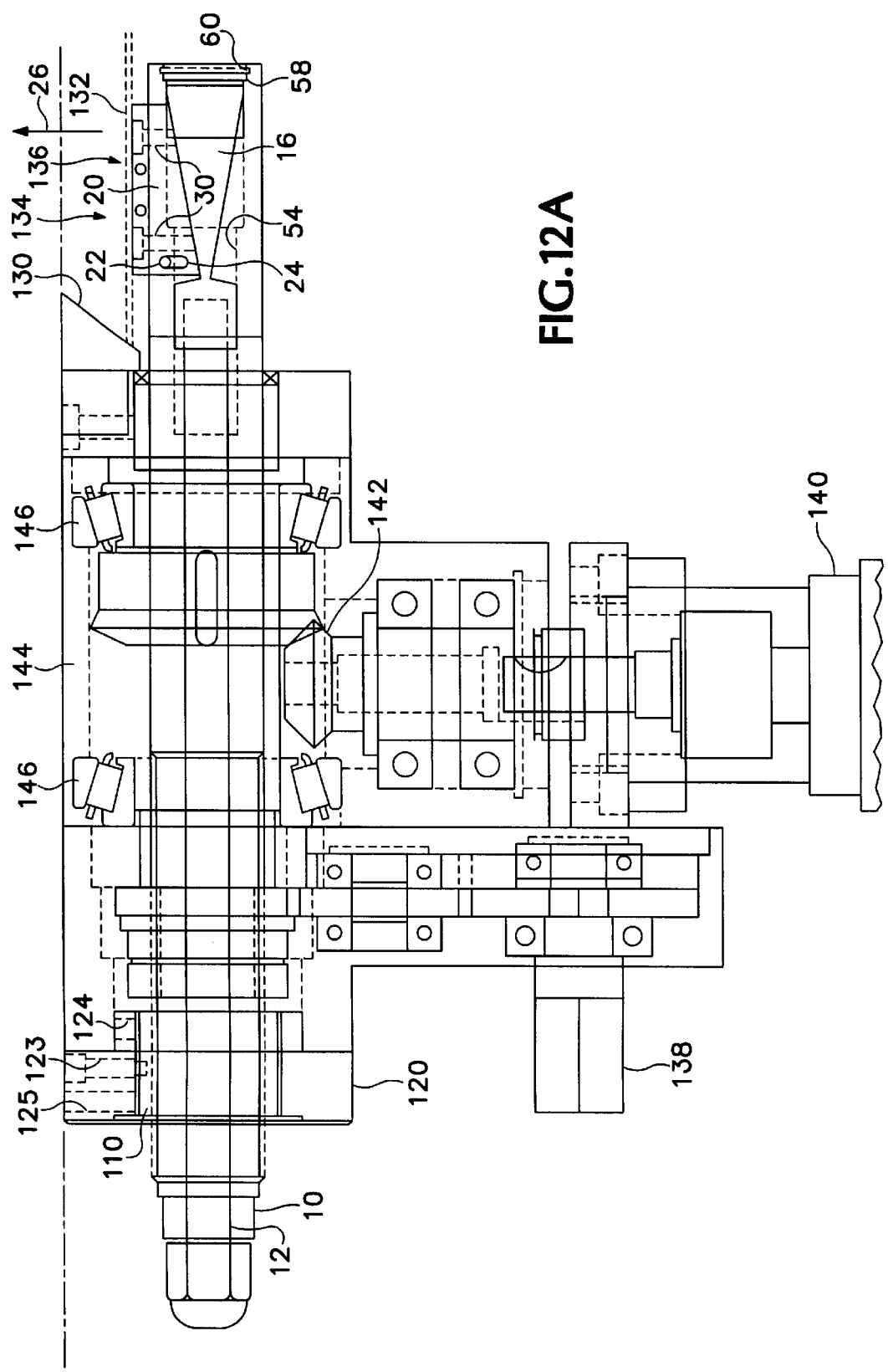
FIG. 12A is a hidden line drawing of the overall pipe beveling machine according to the invention.

An overall hidden line drawing of the pipe beveling machine according to the invention is shown in FIG. 12A, and FIG. 12B which includes the driving mechanisms for rotating the cutting tool 130 to bevel pipe 132 (a portion of which is shown in phantom in FIG. 12A). A motor 140 drives beveled gear 142, which in turn drives a corresponding beveled gear 144 which is operatively connected to the cutting tool 130. Bearings, such as Timken bearings 146 are mounted within the body of the beveling machine, and enable rotation of the cutting tool relative to the body of the device, which is secured to the pipe in a backlash free manner by operation of the various elements described above. Also visible in FIG. 12A, as provided in a preferred embodiment of the invention, are first and second O-rings 134 and 136. The O-rings fit over the end of the mandrel, in corresponding first and second annular slots in the end of the mandrel, and also in corresponding first and second slots in each of the ramp portions 20. The O-rings provide inward bias to the ramp portions, so that when the ramps are not drawn outwardly, they will be urged to a retracted position, to ease insertion of the device into a pipe.

Suitable dimensions of a preferred embodiment are, referring to FIG. 5 and FIGS. 6A–6B, for the threaded portion of the mandrel illustrated at 62, suitably 3.79 inches, from the chamfered end of the mandrel to the end of the threaded portion beyond the key ways 64. The key ways are suitably 0.313 inches wide, and the distance from the center of the mandrel to the bottom of the key way is 0.35 inches. The ramp receiving openings at the other end of the mandrel are 1.5 inches long, and 0.313 inches wide. The mandrel itself is approximately 1 inch in diameter at its thickest portions and id is 9.88 inches in length. Referring to FIGS. 3A and 4B, the actuator member is 2.334 inches long, and is 0.684 inches diameter at the larger end, and 0.555 inches at the narrower end. The narrower diameter portion of the shaft is 1.86 inches long. As noted before, the typical angle of the ramp portion 18 is 10 degrees. The ramp portions 18 are 0.313 inches wide, and are suitably evenly spaced radial y about the actuator at 120 degree spacing.

In use, when a pipe is to be beveled, the end of the mandrel with the ramp portions is inserted into the pipe. Depending on the inner diameter of the pipe, prior to insertion, extenders 32–42 may be secured to the ramp portions, to accommodate larger diameters. The draw nut is then rotated, which causes the draw bolt to pull backwardly, and the interaction of the ramps and the ramp receiving portions of the actuator causes the ramps to move outwardly and securely engage the interior of the pipe. The device is powered by any suitable means, typically an air motor 140 (FIG. 12), which causes rotation of the cutting tool 130 about the mandrel portion, thereby beveling the pipe 132 (in this embodiment). Inward or outward feeding of the tool along the longitudinal axis of the mandrel may be provided, for example, by rotational driving of shaft 138 (FIG. 12A), which translates the body of the pipe beveling tool forwardly or backwardly along the longitudinal axis of the mandrel, by engagement with the threaded portion 62 of the mandrel.

Therefore, according to the invention, an improved pipe beveling device is provided, wherein if the draw bolt breaks, the broken end thereof is retained in the tool, rather than falling into the work piece. The compact size of the mandrel and its gripping system enables use of the device in smaller diameter pipes. Further, an improved backlash prevention is provided according to the invention, that will resist backlash even under high torque. The backlash prevention system is also able to accommodate wear, so even over time, after use of the device, backlash is still prevented. An improved beveling device is thereby provided.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

what is claimed is:

1. A tool chucking system for engaging a tool relative to a pipe comprising:

an actuator member adapted for movement along a longitudinal axis of the pipe, said actuator member having at least one ramp receiving depression defined therein; and a ramp member held in relatively stationary relation along the longitudinal axis, said ramp member engaged with said ramp receiving depression defined in said actuator member and moving radially relative the longitudinal axis in response to longitudinal movement of said actuator member, a draw bar, wherein said actuator member is operatively connected to an end of said draw bar, a mandrel member, wherein said draw bar is received within a central hollow of said mandrel member a securement pin, wherein said ramp member comprises a securement slot defined therein, and wherein said mandrel member comprises a pin receiving opening defined therein, wherein said securement pin, said securement slot and said pin receiving opening cooperate for securing said ramp member to said mandrel member against longitudinal movement, while still enabling radial movement of said ramp member.

2. A tool chucking system for engaging a tool relative to a pipe according to claim 1, wherein said actuator member comprises a generally cylindrical member and wherein said at least one ramp receiving depression is defined in said generally cylindrical member at an angle relative to the longitudinal axis.

3. A tool chucking system for engaging a tool relative to a pipe according to claim 2, wherein said angle is approximately 10 degrees.

4. A tool chucking system for engaging a tool relative to a pipe according to claim 1, further comprising means for retaining said actuator member from falling out of said mandrel member.

5. A tool chucking system for engaging a tool relative to a pipe according to claim 1, wherein said ramp member moves linearly outwardly.

6. A tool chucking system for engaging a tool relative to a pipe according to claim 1, wherein three said ramp receiving depressions are defined in said actuator member, spaced relative to one another radially about said actuator member, approximately 120 degrees apart.

7. A tool chucking system for engaging a tool relative to a pipe, comprising:

an actuator member adapted for movement along a longitudinal axis of the pipe;

a ramp member held in relatively stationary relation along the longitudinal axis, said ramp member engaged with said actuator member and moving radially relative the longitudinal axis in response to longitudinal movement of said actuator member;

a draw bar, wherein said actuator member is operatively connected to an end of said draw bar;

a mandrel member, wherein said draw bar is received within a central hollow of said mandrel member; and means for retaining said actuator from falling out of said mandrel, wherein said retaining means comprises an end cap member at least partially closing one end of said mandrel member.

8. A tool chucking system for engaging a tool relative to a pipe, comprising:
   an actuator member adapted for movement along a longitudinal axis of the pipe; and
   a ramp member held in relatively stationary relation along the longitudinal axis, said ramp member engaged with said actuator member and moving radially relative the longitudinal axis in response to longitudinal movement of said actuator member, wherein said ramp member comprises a ramp height extender receiver thereon, adapted to receive at least one ramp height extension member for changing the height of the ramp, thereby enabling adjustment of the diameter of pipe engageable by said chucking system.

9. A tool chucking system for engaging a tool relative to a pipe according to claim 8, wherein said ramp height extender receiver comprises at least a first threaded hole defined in said ramp member.

10. A tool chucking system for engaging a tool relative to a pipe according to claim 8, further comprising a ramp member retraction member for biasing said ramp member towards a retracted position.

11. A tool chucking system for engaging a tool relative to a pipe according to claim 10, wherein said ramp retraction member comprises at least one elastomeric band positioned around said mandrel and said ramp member.

12. A tool chucking system for engaging a tool relative to a pipe according to claim 11, wherein said ramp member comprises at least one receiving slot therein for receiving said elastomeric band therein.

13. A pipe beveling tool comprising:
   a hollow mandrel positioned within a body of the pipe beveling tool;
   a draw bar positioned within said hollow mandrel;
   an actuator member positioned at an end of said draw bar, said actuator member having three ramp portions defined therein as depressions extending inwardly of a body of said actuator member, towards a center axis thereof;
   three ramp members operatively connected to said mandrel adjacent said actuator member, said ramp members being in relatively stationary relation along a longitudinal axis of said mandrel, said ramp members being operatively engaged with said ramp portions of said actuator member,
   first and second wedge keys, said wedge keys having at least a beveled face thereon, said wedge keys positioned in sliding relation with their respective beveled faces facing one another; and
   an adjustment member for urging at least said first wedge key to slide in a direction relative to said second wedge key, and for holding said first wedge key at a desired position,
   wherein said mandrel and the body have key slots defined therein, for receiving said first and second wedge keys, whereby sliding adjustment of said wedge keys enables said wedge keys to grip and fix said key slots of said mandrel and the body, thereby securing said mandrel and the body against backlash, and
   wherein said ramp members move radially relative the longitudinal axis in response to longitudinal movement of said actuator member as governed by said draw bar.

14. A pipe beveling tool according to claim 13, wherein said three ramp portions are equally spaced radially about said actuator member.

15. A pipe beveling tool according to claim 13, wherein said ramp portions define an angle of approximately 10 degrees.

16. A pipe beveling tool according to claim 13, wherein said ramp members move radially in a non-pivotal manner.

* * * * *